United States Patent
Metal et al.

(10) Patent No.: US 12,330,607 B2
(45) Date of Patent: Jun. 17, 2025

(54) 3D PRINTED MANIFOLD FOR A PNEUMATIC CONTROL PANEL OF A RAILWAY VEHICLE

(71) Applicant: KNORR-BREMSE SYSTEME FÜR SCHIENENFAHRZEUGE GMBH, Munich (DE)

(72) Inventors: Attila Metal, Budapest (HU); Barnabas Kekedi, Gödöllö (HU)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 112 days.

(21) Appl. No.: 17/781,290

(22) PCT Filed: Nov. 13, 2020

(86) PCT No.: PCT/EP2020/082038
§ 371 (c)(1),
(2) Date: May 31, 2022

(87) PCT Pub. No.: WO2021/104896
PCT Pub. Date: Jun. 3, 2021

(65) Prior Publication Data
US 2022/0410864 A1    Dec. 29, 2022

(30) Foreign Application Priority Data
Nov. 29, 2019   (EP) ...................................... 19212529

(51) Int. Cl.
*B60T 17/04*    (2006.01)
*B22F 10/28*    (2021.01)
(Continued)

(52) U.S. Cl.
CPC .............. *B60T 17/04* (2013.01); *B22F 10/28* (2021.01); *B22F 10/66* (2021.01); *B33Y 80/00* (2014.12);
(Continued)

(58) Field of Classification Search
CPC ......... B33Y 80/00; B33Y 10/00; B60T 17/04; B60T 13/26; Y10T 137/6866; Y10T 137/87885; B22F 10/66; B22F 10/28
See application file for complete search history.

(56) References Cited

U.S. PATENT DOCUMENTS

| 5,207,960 A | 5/1993 | Moret de Rocheprise |
| 10,467,807 B1 * | 11/2019 | Strater .................. B33Y 50/00 |

(Continued)

FOREIGN PATENT DOCUMENTS

| DE | 19715528 A1 | 11/1997 |
| DE | 102015205543 A1 | 9/2016 |

(Continued)

OTHER PUBLICATIONS

International Search Report and Written Opinion corresponding to PCT/EP2020/082038, dated Feb. 10, 2021.

(Continued)

*Primary Examiner* — Jessica Cahill
(74) *Attorney, Agent, or Firm* — Barnes & Thornburg LLP

(57) ABSTRACT

A manifold for a pneumatic control panel of a railway vehicle comprises at least one conduit for guiding a pneumatic fluid and at least one attachment section for attaching a pneumatic device. The manifold is obtained from a blank that is obtained by an additive manufacturing process. A method for producing a manifold for a pneumatic control panel of a railway vehicle, the manifold comprising at least one conduit for guiding a pneumatic fluid and at least one (Continued)

attachment section for attaching a pneumatic device comprises a first step wherein a blank for the manifold is formed by an additive manufacturing process.

13 Claims, 5 Drawing Sheets

(51) Int. Cl.
  *B22F 10/66* (2021.01)
  *B33Y 10/00* (2015.01)
  *B33Y 80/00* (2015.01)
  *B60T 13/26* (2006.01)
  *B33Y 40/20* (2020.01)

(52) U.S. Cl.
  CPC ............... *B60T 13/26* (2013.01); *B33Y 10/00* (2014.12); *B33Y 40/20* (2020.01)

(56) References Cited

U.S. PATENT DOCUMENTS

| | | | | |
|---|---|---|---|---|
| 11,168,801 | B2* | 11/2021 | Glime, III | ............... F16L 11/15 |
| 11,541,584 | B1* | 1/2023 | Quinonez | ........... B29C 45/2738 |
| 2012/0192957 | A1* | 8/2012 | Scharpf | .................. B60T 17/04 137/15.01 |
| 2016/0131165 | A1* | 5/2016 | Collins | ..................... B22F 5/10 137/561 A |
| 2016/0290368 | A1* | 10/2016 | Collins | ............... F16K 31/0675 |
| 2017/0203511 | A1* | 7/2017 | Burkhart | ................... B22F 7/04 |
| 2017/0204989 | A1* | 7/2017 | Burkhart | ............... F16K 27/003 |
| 2018/0128383 | A1* | 5/2018 | Sutterfield | ............ F16K 27/044 |
| 2018/0291933 | A1* | 10/2018 | Weickel | ............. F15B 13/0821 |
| 2018/0306212 | A1* | 10/2018 | Weickel | ............. F15B 13/0839 |
| 2019/0219012 | A1 | 7/2019 | Wicks | |
| 2019/0271050 | A1 | 9/2019 | Craft | |

FOREIGN PATENT DOCUMENTS

| | | |
|---|---|---|
| KR | 20140010053 A | 1/2014 |
| WO | 2015151058 A1 | 10/2015 |
| WO | 2017058238 A1 | 4/2017 |

OTHER PUBLICATIONS

Korean Office Action corresponding to KR 10-2022-7021915, dated Jan. 30, 2024.
EP Communication of a notice of opposition corresponding EP19212529.2-1009 to dated Jun. 20, 2024.
Chinese Office Action corresponding to CN 202080082614.2 dated May 31, 2024.
DMLS—Development History and State of the Art; dated Sep. 21-24, 2004.
6 Important Design Considerations for Metal 3D Printing; dated May 24, 2018.
The magazine for the metal additive manufacturing industry—Metal AM; dated Autumn 2017.
Wikipedia "Selective laser melting." dated Jul. 5, 2024.

* cited by examiner

3D PRINTED MANIFOLD FOR A PNEUMATIC CONTROL PANEL OF A RAILWAY VEHICLE

CROSS REFERENCE AND PRIORITY CLAIM

This patent application is a U.S. National Phase of International Patent Application No. PCT/EP2020/082038 filed Nov. 13, 2020, which claims priority to European Patent Application No. 19212529.2, the disclosure of which being incorporated herein by reference in their entireties.

FIELD

Disclosed embodiments relate to a manifold for a pneumatic control panel of a railway vehicle and to a method for producing the manifold.

BACKGROUND

A pneumatic control panel of this kind controls, for example, a sanding or brake unit of a railway vehicle. The pneumatic control panel comprises the manifold which provides at least one conduit forming a pneumatic connection or pneumatic flow path between an input, an output and/or one or more pneumatic or electropneumatic components and/or component assemblies.

A known manifold is manufactured from a cast rectangular aluminum baseplate of cuboid form, into which the conduits are machined in the form of air passages and bores. Compressed air enters the manifold via a compressed air inlet. Pneumatic devices, for example a stopcock, which serves to shut off the air supply to the module, are mounted on the aluminum baseplate. A conduit within the manifold connects the stopcock to a pressure reducing valve, which is also a pneumatic device, and which lowers the incoming pressure to a required working pressure of the sanding or brake unit. Further conduits connect the pressure reducing valve to two magnet valves, which also are pneumatic devices, in parallel, which receive their supply of compressed air and are responsible for delivering the compressed air to the sanding or brake unit via an outlet.

In general, manifolds for pneumatic control panels are both large and heavy due to being machined from what is basically a slab of metal. Available tools for machining the conduits within the manifold limit the form and arrangement of the conduits within the manifold.

In DE 197 15 528 A1, a modular pneumatic control panel is described that can be rapidly adapted to different pneumatic brake systems by making the manifold comprise a multitude of different conduit modules which can be combined individually.

In DE 10 2015 205 543 A1 it is described to manufacture the manifold as a cuboid block by 3D printing to allow for different forms and more precise arrangement of the conduits within the manifold.

SUMMARY

Disclosed embodiments remediate the above-mentioned problems and to provide a manifold that allows for building a more compact pneumatic control panel. Disclosed embodiments provide a flexible and adaptable method for producing such a manifold.

BRIEF DESCRIPTION OF FIGURES

Further variations, aspects and advantages of the disclosed embodiments will become clear from the subsequent description of embodiments shown in the enclosed figures by way of example only. The description references the accompanying figures of which.

DETAILED DESCRIPTION

Figure 1:
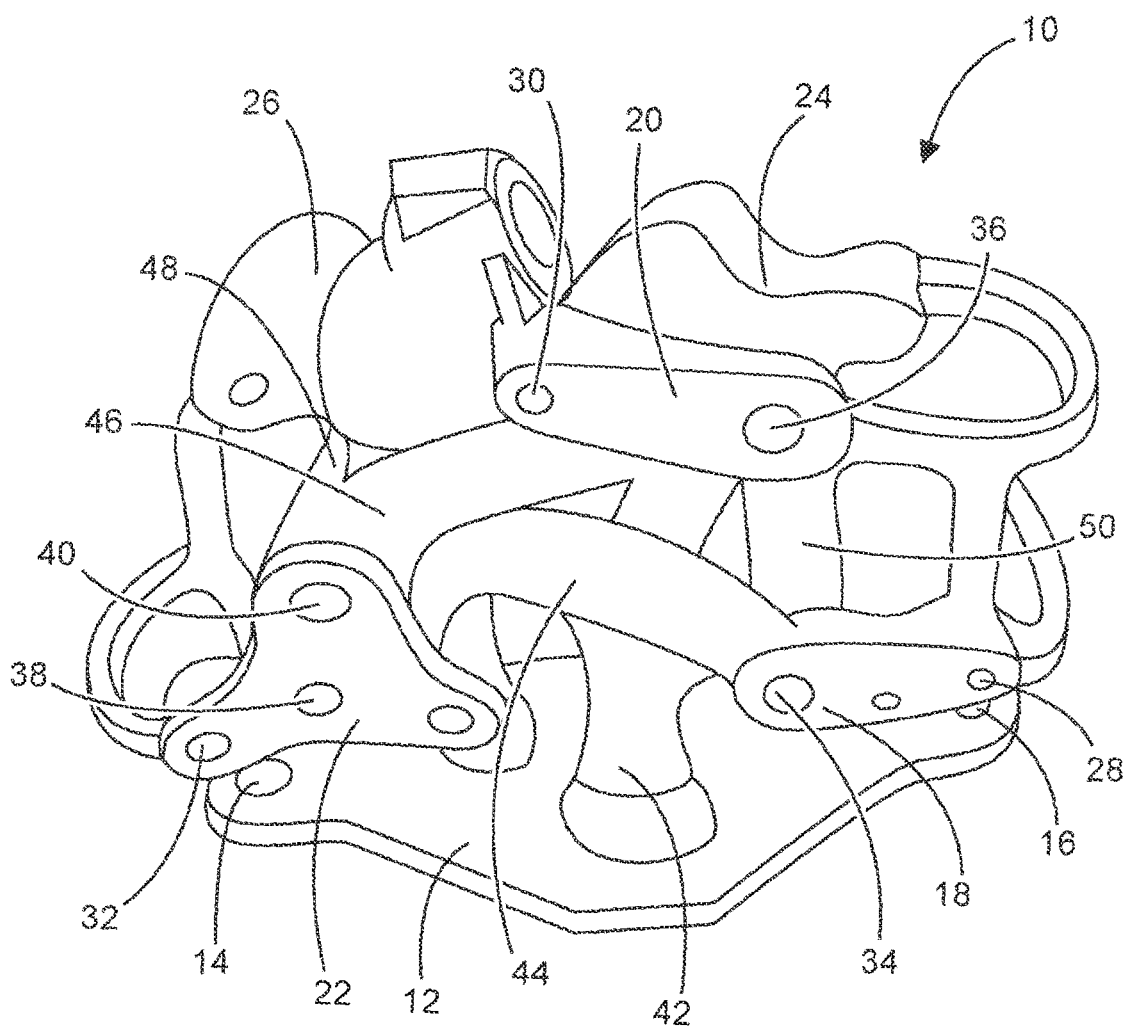
FIG. 1 shows a 3D-representation of a manifold according to an embodiment.

Disclosed embodiments provide a manifold for a pneumatic control panel of a railway vehicle, wherein the manifold comprises at least one conduit for guiding a pneumatic fluid and at least one attachment section for attaching a pneumatic device. The manifold is obtained from a blank. The blank is obtained by an additive manufacturing process.

Using an additive manufacturing process, for example a 3D printing process, allows for the blank to comprise conduits with more complex geometries than would be possible with a drilled or milled base plate. This permits arrangements of the pneumatic components on the manifold that result in a smaller overall volume of the pneumatic control panel so that less space is needed within the railway vehicle for the pneumatic control panel. Furthermore, only the material that is necessary for the conduits, or rather for the conduit walls, is manufactured into the blank such that the resulting manifold has a reduced weight. This is advantageous in vehicle applications because it reduces the energy required for acceleration and deceleration.

In another aspect of the disclosed embodiments, the manifold may be obtained from the blank by a machining process, in addition to the additive manufacturing process. In the machining process, structures that are hard or impossible to form by the additive manufacturing process can be formed. It is, for example, not always possible to create threaded joints in an additive manufacturing process with sufficient precision. However, these can be easily produced in a subsequent machining process. Furthermore, parts of the blank that are not required for the manifold can be removed by the machining process.

In another aspect of the disclosed embodiments, the additive machining process may be a direct metal layer sintering (DLMS) process. A direct metal layer sintering process can directly produce a metal blank. The direct metal layer sintering process can create internal as well as external complexity of the blank.

In another aspect of the disclosed embodiments, the blank may comprise a mechanism for affixing the blank for use in the machining process. Such a mechanism may be used in the machining process to increase the precision of the machining process.

In another aspect of the disclosed embodiments, the conduit may comprise a wall section and a flow-through section, wherein the wall section may optionally have a thickness of less than 2 mm. In this way, only the material that is necessary for the function of the conduits is added to the blank by the additive manufacturing process. The blank and the resulting manifold are thus lighter and cheaper to produce as less metal is required.

In another aspect of the disclosed embodiments, the manifold may optionally be a one-piece manifold. Manufacturing the manifold as a single piece or monolithically increases stability for attaching pneumatic devices to the manifold.

As a solution, disclosed embodiments provide a method for producing a manifold for a pneumatic control panel of a railway vehicle, wherein the manifold comprises at least one conduit for guiding a pneumatic fluid and at least one attachment section for attaching a pneumatic device. A blank for the manifold is formed by an additive manufacturing process in a first operation.

Using an additive manufacturing process, for example a 3D printing process, allows for the blank to comprise conduits with more complex geometries than would be possible with a drilled or milled base plate. This permits arrangements of the pneumatic components on the manifold that result in a smaller overall volume of the pneumatic control panel so that less space is needed within the railway vehicle for the pneumatic control panel. Furthermore, only the material necessary for the conduits, or rather for the conduit walls, is manufactured into the blank such that the resulting manifold has a reduced weight. This is advantageous in vehicle applications because it reduces the required energy for acceleration and deceleration.

In another aspect of the disclosed embodiments, the blank may, in addition, be machined to become the manifold by a machining process. In the machining process, structures that are hard or impossible to form by the additive manufacturing process can be formed. It is, for example, not always possible to create threaded joints in an additive manufacturing process. However, these can be easily produced in a subsequent machining process.

In another aspect of the disclosed embodiments, the additive manufacturing process may optionally comprise an arrangement operation and a manufacturing operation. The manufacturing operation is carried out using a direct metal layer sintering (DLMS) process. A direct metal layer sintering process can directly produce a metal blank. The direct metal layer sintering process can create internal as well as external complexity of the blank.

In another aspect of the disclosed embodiments, the arrangement operation may optionally comprise a minimization operation, in which the position and rotation of the attachment sections is determined such that the manifold comprises a minimal volume while still allowing the pneumatic devices to be attached. In this way, with the pneumatic control panel, which comprises the manifold and the attached pneumatic devices will require less space within the vehicle.

In another aspect of the disclosed embodiments, the arrangement operation may optionally comprise a routing operation, in which a cross-section and an arrangement of the at least one conduit is determined. In this way, the increased allowable internal and external complexity afforded by the direct metal layer sintering process may be advantageously exploited to avoid unnecessary complexity of the conduits. For example, it may be possible to arrange conduits side-by-side instead of running them on multiple levels by changing the form of their cross-section.

In another aspect of the disclosed embodiments, the arrangement operation may optionally comprise a rotation operation in which a spatial rotation of the blank for the manufacturing operation is determined, wherein one or more parameters of the manufacturing operation which are determined by the spatial rotation are used to determine an optimal spatial rotation according to one or more criteria, which criteria comprise at least one of the following: required duration of the manufacturing operation, ease of accessibility of the parts of the blank to be machined during the second operation, reduction of residual stresses within the blank, reduction of required supports for the manufacturing operation. In this way, the additive manufacturing process can be tailored to the specific needs of the blank and/or the manifold.

In another aspect of the disclosed embodiments, a third operation is carried out after the second operation, comprising a testing operation for determining whether the manifold conforms to previously defined specifications.

FIG. 1 shows a manifold 10 for a pneumatic control panel of a railway vehicle according to a disclosed embodiment. The manifold 10 comprises a base section 12, for example for attaching the manifold 10 to a railway vehicle. If the base section 12 is to be used for attaching the manifold 10 to a railway vehicle, it may comprise openings for mechanism for affixing it, for example through-holes 14, 16.

The manifold 10 further comprises attachment sections 18, 20, 22, 24, 26 for attaching pneumatic devices. Each of the attachment sections 18, 20, 22, 24, 26 may comprise one or more fixation openings, for example the bores 28, 30, 32. The bores 28, 30, 32 are through-holes.

In a further embodiment, the bores 28, 30, 32 may, for example, be threaded.

Each of the attachment sections 18, 20, 22, 24, 26 further comprise conduit openings 34, 36, 38, 40. The conduit openings 34, 36, 38, 40 provide access to conduits 42, 44, 46, 48, 50.

In alternative embodiments, the number of attachment sections 18, 20, 22, 24, 26, the number of fixation openings as well as the number of conduit openings 34, 36, 38, 40 and the number of conduits 42, 44, 46, 48, 50 each depends on the particular pneumatic control panel for which the manifold 10 is intended and is given in FIG. 1 purely as an example. The particular arrangement of the attachment sections 18, 20, 22, 24, 26, the bores 28, 30, 32, the conduit openings 34, 36, 38, 40 and the conduits 42, 44, 46, 48, 50 depends on the particular pneumatic control panel for which the manifold 10 is intended and is given in FIG. 1 purely as an example.

In alternative embodiments, the manifold 10 may thus comprise alternatively more or fewer conduits as well as more or fewer openings and/or sections.

The manifold 10 is obtained from a blank obtained by an additive manufacturing process. The manifold 10 is in addition obtained from the blank by a machining process in which, for example, structures are machined into the manifold 10 that are impossible or hard to obtain or not obtainable with sufficient precision by an additive manufacturing process.

Figure 2:
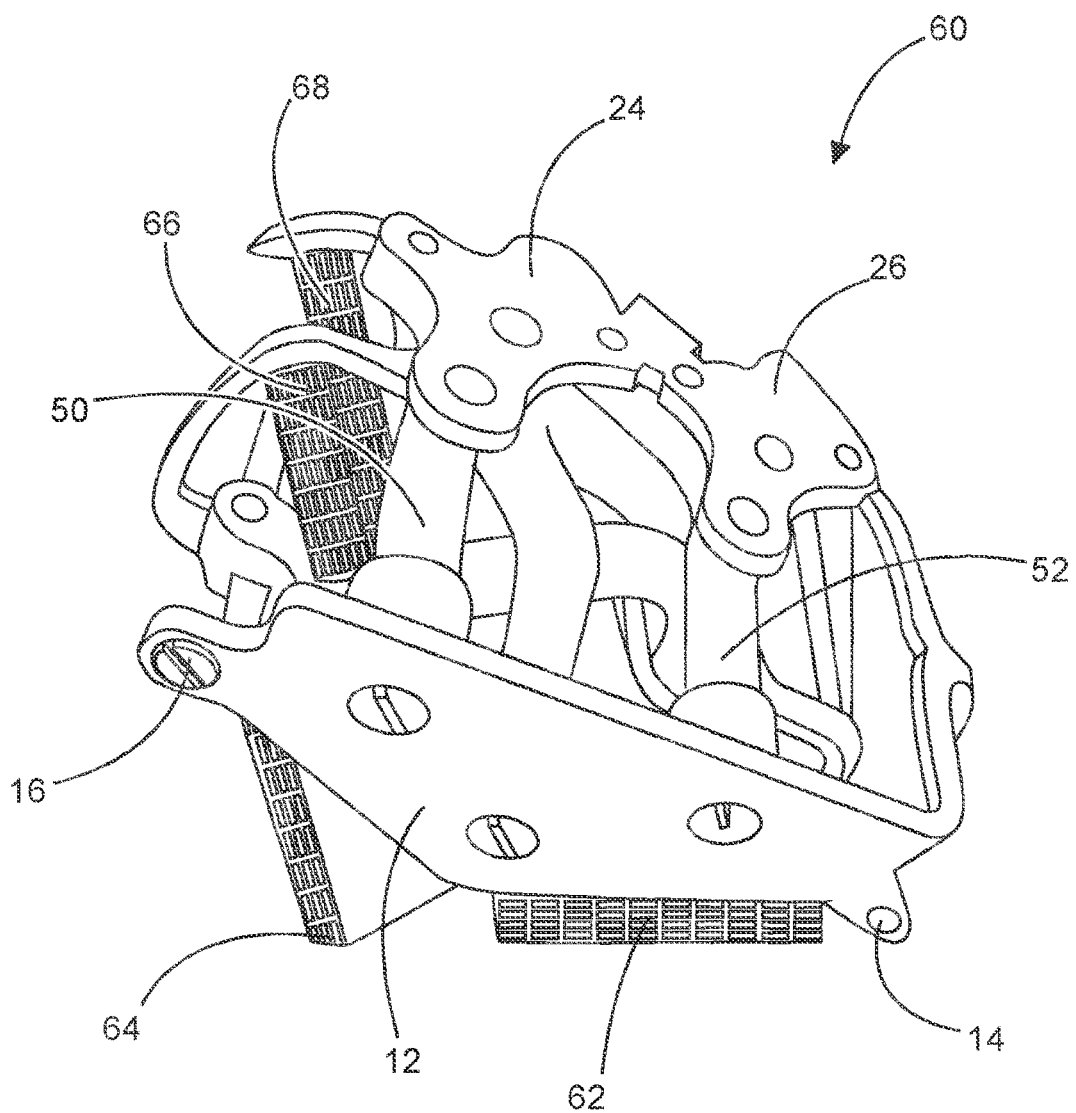
FIG. 2 shows a 3D-representation of a blank for obtaining a manifold according to an embodiment.

FIG. 2 shows a blank 60 obtained by an additive manufacturing process according to a disclosed embodiment. The blank 60 is obtained by direct metal layer sintering (DLMS). The metal of the blank 60 is here, for example, aluminum.

An additional conduit 52 which was not visible in FIG. 1 is shown in FIG. 2.

Direct metal layer sintering works by building the blank 60 layer by layer against the direction of gravity. Due to gravity, material that is added to a layer where there is no support below it in the direction of gravity could not be attached to sufficient support and, accordingly, could not be printed. In direct metal layer sintering, such sections are supported by, for example, a metal mesh 62, 64, 66, 68. The machining process by which the manifold 10 is obtained from the blank 60 comprises removing the supporting metal meshes 62, 64, 66, 68.

The blank 60 comprises the through-holes 14, 16 which may later be used to attach the manifold 10 to a railway vehicle. The through-holes 14, 16 may also be used as a mechanism for affixing the blank for use in the machining process.

In this example embodiment, the manifold 10 and the blank 60 both are one-piece devices.

Figure 3:
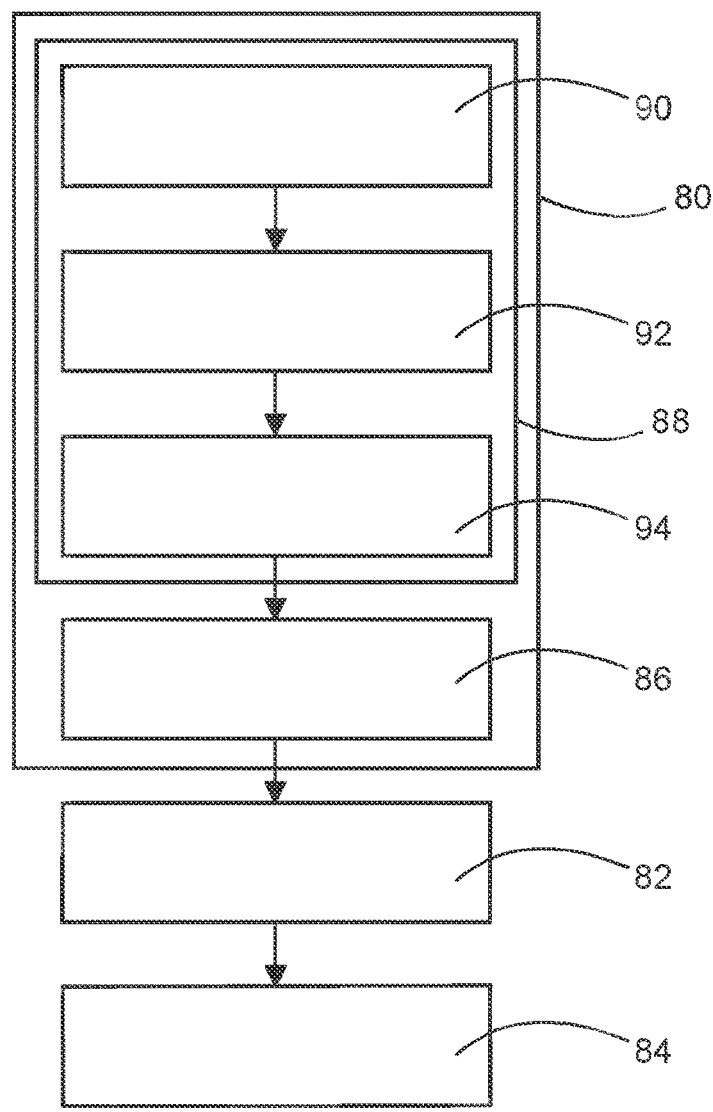
FIG. 3 shows a flow diagram of a method according to an embodiment.

FIG. 3 shows the method for producing the manifold 10 according to a disclosed embodiment. For example, in a first operation 80, the blank 60 is formed by an additive manufacturing process. In a second operation 82, the manifold 10 is obtained from the blank 60 by a machining process. In a third operation 84, the manifold 10 is tested to determine whether it conforms to a required specification.

The first operation 80 comprises a manufacturing operation 86 and an arrangement operation 88. The arrangement operation 88, in this example, comprises a minimization operation 90, a routing operation 92 and a rotation operation 94.

During the minimization operation 90, the blank 60 is minimized such that the manifold 10 will comprise a minimal volume. To form a pneumatic control panel, the manifold 10 will have pneumatic devices attached. The minimal volume of the manifold 10 may be obtained by, for example, moving and/or rotating the attachment sections 18, 20, 22, 24, 26 such that outputs of some of the pneumatic devices are arranged closely to associated inputs of other pneumatic devices while providing sufficient space for attaching the pneumatic devices to the manifold 10.

In the routing operation 92, the conduits 42, 44, 46, 48, 50, 52 are arranged between the attachment sections 18, 20, 22, 24, 26. It may happen that multiple conduits 42, 44, 46, 48, 50, 52 would need to be arranged in the same space or in an overlapping fashion. In that case in particular, it is possible to change the form of a cross-section of any of the conduits 42, 44, 46, 48, 50, 52. If necessary, the conduits 42, 44, 46, 48, 50, 52 may each have a different cross-section which may, if necessary, vary over the length of the conduits 42, 44, 46, 48, 50, 52 as well.

In the rotation operation 94, a rotation or spatial rotation of the blank 60 during the manufacturing operation 86 is determined. The rotation of the blank 60 may determine a variety of parameters of the manufacturing operation 86 as well as the second operation 82. In particular, the rotation of the blank 60 may change the required quantity of metal mesh 62, 64, 66, 68 to be removed in the second operation 82. Because manufacturing the metal mesh 62, 64, 66, 68 also takes time during the manufacturing operation 86, this would influence the time required for the manufacturing operation 86 as well as the time required for the second operation 82.

Furthermore, depending on the rotation of the blank 60, parts of the metal meshes 62, 64, 66, 68 used as support may be hard to reach during the second operation 82.

Direct metal layer sintering is a process involving heat. Since metal expands when it is heated and shrinks when it cools, disadvantageous arrangement of the blank 60 during the manufacturing operation 86 may increase residual stresses within the blank 60, for example due to uneven cooling within a layer while the layer is being printed.

Furthermore, the printing time of each layer depends on how much material is disposed within the layer. The maximum dimensions of a layer that is printed may be designated a footprint of the blank 60 in a plane x-y while the layers of metal are added in a direction z. Each additional layer of the blank 60 requires creating a layer of raw materials during the manufacturing operation 86 which a timespan that is mostly independent of the footprint of that layer. Generally, it is faster to print fewer layers with larger footprints than more layers with smaller footprints. Thus, it may be expedient to rotate the blank 60 in rotation operation 94 in a way to increase its footprint and to decrease the number of layers that need to be added during the manufacturing operation 86, which in turn reduces production time.

These different aspects of the rotation operation 94 may work against each other, influencing parameters of the manufacturing operation 86 in opposing ways. This means that an optimization for, e.g., having very little metal mesh 62, 64, 66, 68 as a support may in turn increase the number of layers that have to be added during the manufacturing operation 86, thus increasing manufacturing time, or have other undesirable effects.

It may thus be expedient to define criteria for which parameters are to be optimized, which may be different in any individual case. These criteria may be, for example, a required duration of the manufacturing operation 86, ease of accessibility of the parts of the blank 60 to be machined during the second operation 82, reduction of residual stresses within the blank 60 and/or reduction of required support for the manufacturing operation 86.

In the second operation 82, the blank 60 is machined to become the manifold 10. Supports, for example the metal meshes 62, 64, 66, 68, are removed.

In alternative embodiments, if structures are to be formed in the manifold 10 that are not obtainable by the additive manufacturing process, these can be obtained by metal machining in the second operation 82. One example for structures that are not always obtainable by additive manufacturing process are threaded joints. The machining process of the second operation 82 may thus comprise, for example, drilling, turning and/or milling parts of the blank 60.

In the third operation 84, the manifold 10 is tested against previously defined specifications. Such specifications may comprise, for example, standards that are relevant for the manifold 10, defining, for example, mechanical and/or load requirements. Furthermore, the conduits may be tested for airtightness. The actual specifications to be tested against will need to be defined individually for each type of manifold 10.

The minimization operation 90, the routing operation 92 and the rotation operation 94 may be carried out by a computer and/or an operator.

Figure 4:
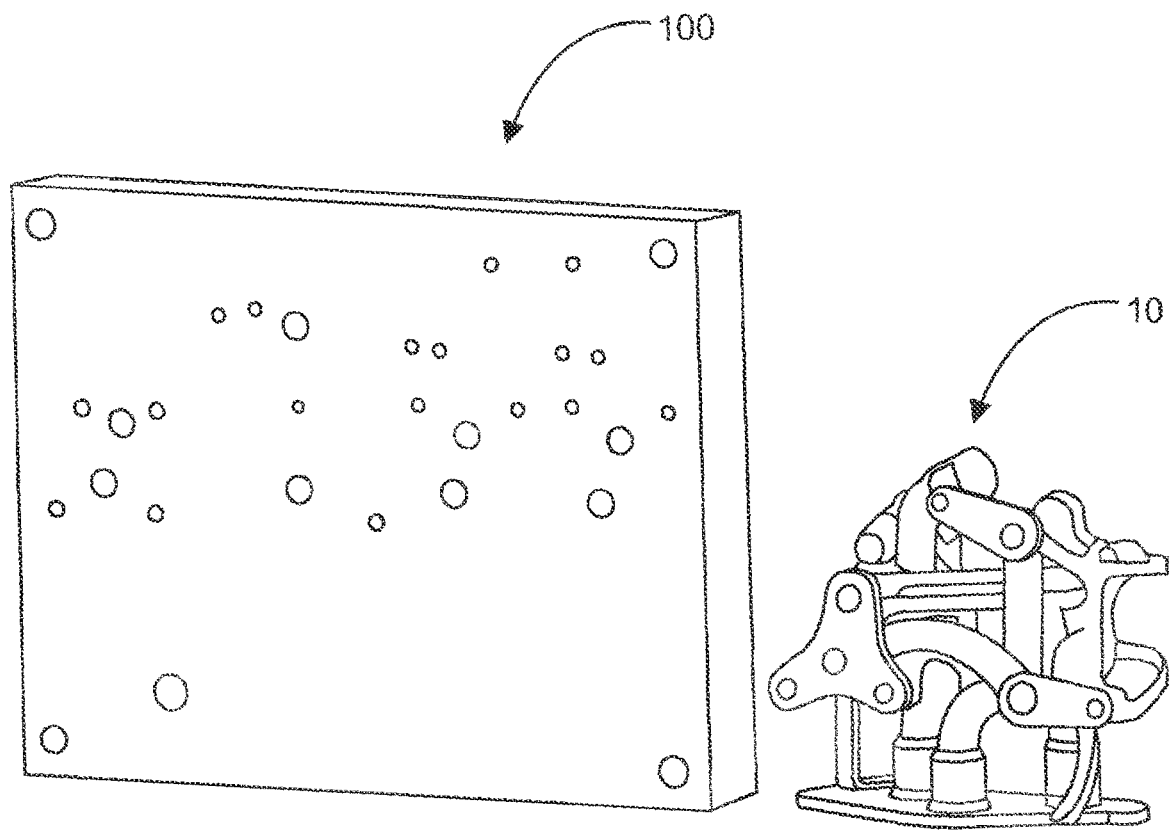
FIG. 4 shows a 3D-representation of a prior art manifold compared to a manifold according to an embodiment.

FIG. 4 shows the manifold 10 in comparison to a prior art manifold 100. The manifold 10 is far smaller and lighter than the prior art manifold 100.

Figure 5:
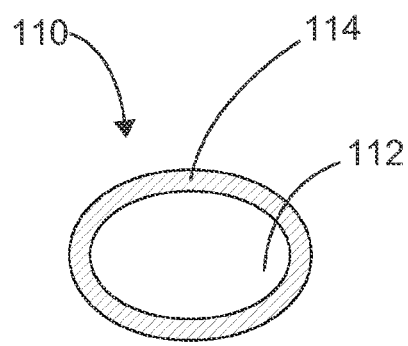
FIG. 5 shows a 3D representation of a conduit having a non-circular cross-section according to an embodiment.

FIG. 5 shows another embodiment, in which a conduit 110 has a conduit wall 114 and a conduit flow-through section 112. A cross-section of the flow-through section 112 is elliptic.

Figure 6:
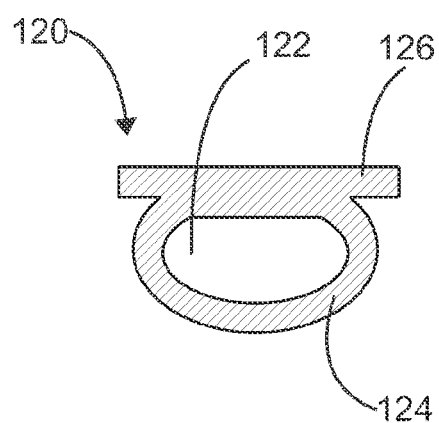
FIG. 6 shows a 3D representation of a conduit having a non-circular cross-section according to an embodiment.

FIG. 6 shows another embodiment, in which a conduit 120 has a flow-through section 122 and a conduit wall 124. The conduit wall 124 is manufactured as one piece with a second wall 126. In alternative embodiments, the second wall 126 may, for example, be a wall of another conduit or a support wall of the manifold 10.

Figure 7:
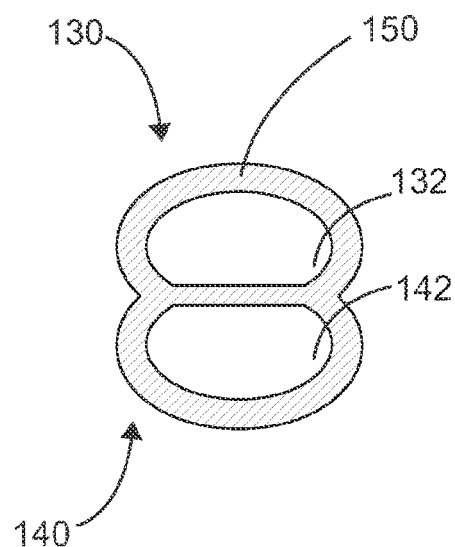
FIG. 7 shows a 3D representation of conduits having a non-circular cross-section according to an embodiment.

FIG. 7 shows another embodiment, in which two conduits 130, 140 are arranged next to each other with their flow-through sections 132, 142. The flow-through sections 132, 142 have mostly elliptic cross-sections which are flattened on one side. The conduit wall 150 is common to both conduits 130, 140.

The skilled person may find many different variations of the disclosed embodiments not specifically illustrated herein.

For example, in an alternative embodiment, the conduits 42, 44, 46, 48, 50, 52, 110, 120, 130, 140, when viewed in cross-section, each comprise a flow-through section and a wall section having a wall thickness. The wall thickness may be, for example, optionally between 1 mm and 4 mm, more specifically between 1 mm and 2 mm, further more specifically between 1.4 mm and 1.6 mm, or may, further more specifically, be 1.5 mm with a tolerance of +/−0.1 mm.

In an alternative embodiment, the flow-through section may have any cross-section form that is obtainable by the additive manufacturing process if the surface of the cross-section is sufficiently large to allow for the required pneumatic flows. The cross-section may, for example, be elliptical, rectangular or may, for example, comprise multiple sub-sections each having the same or a different cross-section form. In this way, it is possible to arrange the conduits 42, 44, 46, 48, 50, 52, 110, 120, 130, 140 with their required cross-section surfaces as close to each other. Furthermore, the complexity of the conduits 42, 44, 46, 48, 50, 52, 110, 120, 130, 140 is reduced as, if they compete for space in the manifold, they can be arranged alongside with appropriate cross-sections instead of being routed around each other over multiple levels.

In an alternative embodiment, any structure in the manifold 10 that may guide a pneumatic fluid between an inflow, an outflow and/or pneumatic devices may be considered a conduit 42, 44, 46, 48, 50, 52, 110, 120, 130, 140.

Disclosed embodiments provide a manifold 10 that is small, lightweight and may be manufactured easily, thus allowing the construction of a compact pneumatic control panel for a railway vehicle.

LIST OF REFERENCE SIGNS 10 manifold
12 base section
14 through-hole
16 through-hole
18 attachment section
20 attachment section
22 attachment section
24 attachment section
26 attachment section
28 bore
30 bore
32 bore
34 conduit opening
36 conduit opening
38 conduit opening
40 conduit opening
42 conduit
44 conduit
46 conduit
48 conduit
50 conduit
52 conduit
60 blank
62 metal mesh
64 metal mesh
66 metal mesh
68 metal mesh
80 first operation
82 second operation
84 third operation
86 manufacturing operation
88 arrangement operation
90 minimization operation
92 routing operation
94 rotation operation
100 prior art manifold
110 conduit
112 flow-through section
114 wall
120 conduit
122 flow-through section
124 wall
126 second wall
130 conduit
132 flow-through section
140 conduit
142 flow-through section
150 wall

The invention claimed is:

1. A manifold for a pneumatic control panel of a railway vehicle, the manifold comprising:
    a plurality of conduits for guiding pneumatic fluid coupled to a blank base; and
    attachment sections each having one or more fixation openings and one or more conduit openings for attaching a pneumatic device, the one or more the conduit openings arranged at varying angles relative each other,
    wherein the manifold is formed from a blank that is manufactured by an additive manufacturing process, and wherein,
    wherein each of the plurality of conduits is located between the attachment sections, and wherein multiple of the plurality of conduits have a reduction in a cross-sectional at an area of the manifold and in an overlapping fashion.

2. The manifold of claim 1, wherein the manifold is further formed from the blank by a machining process.

3. The manifold of claim 2, wherein the blank comprises structure configured to affix the blank base during the machining process.

4. The manifold of claim 1, wherein the additive machining process is a direct metal layer sintering process.

5. The manifold of claim 4, wherein the blank comprises structure configured to affix the blank base during the machining process.

6. The manifold of claim 1, wherein the at least one of the plurality of conduits comprises a wall section and a flow-through section, wherein the wall section has a thickness of less than 2 mm.

7. The manifold of claim 1, wherein the manifold is a one-piece manifold.

8. A method for producing a manifold for a pneumatic control panel of a railway vehicle, the manifold including a plurality of conduits for guiding pneumatic fluid and attachment sections each having one or more fixation openings and one or more conduit openings for attaching a pneumatic device, wherein each of the plurality of conduits is located between the attachment sections, wherein the method comprises, in a first operation, a blank for the manifold is formed by an additive manufacturing process,
    wherein the additive manufacturing process comprises an arrangement operation and a manufacturing operation wherein the arrangement operation comprises a routing operation comprising determining a cross-section and an arrangement of each of the plurality of conduits between the attachment sections, and wherein the routing operation determines whether multiple of the plurality of conduits have a reduction in a cross-sectional at an area of the manifold and in an overlapping fashion.

9. The method of claim 8, the method comprising, in a second operation, the blank is machined to become the manifold.

10. The method of claim 9, wherein a third operation to be carried out after the second operation comprises a testing operation for determining whether the manifold conforms to previously defined specifications.

11. The method of claim 8, wherein the manufacturing operation includes a direct metal layer sintering process.

12. The method of claim 11, wherein the arrangement operation comprises a minimization operation, in which the position and rotation of at least one of the attachment sections is determined such that the manifold comprises a minimal volume while still enabling pneumatic devices to be attached.

13. The method of claim 11, wherein the arrangement operation comprises a rotation operation in which a spatial rotation of the blank for the manufacturing operation is determined, wherein one or more parameters of the manufacturing operation which are determined by the spatial rotation are used to determine an optimal spatial rotation according to one or more criteria, which criteria comprise at least one of the following: required duration of the manufacturing operation, ease of accessibility of the parts of the blank to be machined during a second operation, reduction of residual stresses within the blank, reduction of required supports for the manufacturing operation.

* * * * *